US008266355B2

(12) United States Patent
Lee et al.

(10) Patent No.: US 8,266,355 B2
(45) Date of Patent: Sep. 11, 2012

(54) ELECTRONIC APPARATUS TRANSMITTING AND RECEIVING SIGNAL THROUGH SINGLE WIRE

(75) Inventors: Hee Bum Lee, Gyunggi-do (KR); Hyun Chul Jung, Gyunggi-do (KR); Kyoung Soo Chae, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 388 days.

(21) Appl. No.: 12/618,254

(22) Filed: Nov. 13, 2009

(65) Prior Publication Data

US 2010/0308838 A1 Dec. 9, 2010

(30) Foreign Application Priority Data

Jun. 4, 2009 (KR) ........................ 10-2009-0049380

(51) Int. Cl.
*G06F 3/00* (2006.01)
*G06F 13/00* (2006.01)
*G06F 13/42* (2006.01)

(52) U.S. Cl. .......... 710/104; 710/105; 710/106; 710/15; 710/19

(58) Field of Classification Search .............. 710/15–19, 710/104–106, 117, 124, 316

See application file for complete search history.

(56) References Cited

U.S. PATENT DOCUMENTS 4,477,896 A * 10/1984 Aker ............................ 370/201
5,956,520 A 9/1999 Kishi et al.
6,006,143 A * 12/1999 Bartel et al. ...................... 701/1
6,112,275 A * 8/2000 Curry et al. .................. 711/100
6,239,732 B1 5/2001 Cusey
6,965,950 B1 11/2005 Nagasawa et al.
7,181,557 B1 2/2007 Falik et al.
2004/0049616 A1 3/2004 Dunstan et al.
2007/0073449 A1* 3/2007 Kraemer et al. .................. 701/1
2009/0157928 A1* 6/2009 Riegebauer .................. 710/110

FOREIGN PATENT DOCUMENTS

KR 20010015076 A 2/2001
KR 1020080002065 A 1/2008

OTHER PUBLICATIONS

Korean Office Action for Application No. 10-2009-0049380, issued Dec. 8, 2010.

* cited by examiner

*Primary Examiner* — Thomas J Cleary
(74) *Attorney, Agent, or Firm* — Lowe, Hauptman, Ham & Berner, LLP

(57) ABSTRACT

There is provided an electronic apparatus transmitting and receiving a signal through a single wire that that has a main electronic apparatus and a sub-electronic apparatus connected through a single wire, transmits status information and performs control and communication through the single wire. The electronic apparatus transmitting and receiving a signal through a single wire may include: a sub-electronic apparatus transmitting a detection signal containing status information through a single wire, and performing a predetermined operation upon receiving a response signal to the detection signal; and a main electronic apparatus receiving the detection signal through the single wire and transmitting the response signal having a different signal format from the detection signal to the sub-electronic apparatus.

4 Claims, 3 Drawing Sheets

FIG. 4
ANALOG
START AND ADDRESS
DATA
END

ELECTRONIC APPARATUS TRANSMITTING AND RECEIVING SIGNAL THROUGH SINGLE WIRE

CROSS-REFERENCE TO RELATED APPLICATIONS

This application claims the priority of Korean Patent Application No. 10-2009-0049380 filed on Jun. 4, 2009, in the Korean Intellectual Property Office, the disclosure of which is incorporated herein by reference.

BACKGROUND OF THE INVENTION

1. Field of the Invention

The present invention relates to an electronic apparatus transmitting and receiving a signal through a single wire, and more particularly, to an electronic apparatus transmitting and receiving a signal through a single wire that includes a main electronic apparatus and a sub-electronic apparatus connected through a single wire, transmits status information and performs control and communication through the single wire.

2. Description of the Related Art

In general, an electronic apparatus may be configured into one set performing various kinds of operations. Alternatively, an electronic apparatus may include a main electronic apparatus that controls the main and auxiliary operations and a sub-electronic apparatus that is connected to the main electronic apparatus and performs the auxiliary operation.

The main electronic apparatus and the sub-electronic apparatus may be connected to each other using a plurality of cables for interfacing operations such as communications, control and recognition.

However, the plurality of cables, which are physically connected between the main electronic apparatus and the sub-electronic apparatus, increase physical contact lines to cause difficulties in mechanical design and thus increase manufacturing costs. Besides, when only a small amount of the plurality of cables make contact, it becomes impossible to implement a desired operation. Even when an electronic apparatus performs normally, the electronic apparatus may be determined as a failure due to a simple loose contact.

SUMMARY OF THE INVENTION

An aspect of the present invention provides an electronic apparatus transmitting and receiving a signal through a single wire that has a main electronic apparatus and a sub-electronic apparatus connected through a single wire, transmits status information, and performs control and communication through the single wire.

According to an aspect of the present invention, there is provided an electronic apparatus transmitting and receiving a signal through a single wire, the electronic apparatus including: a sub-electronic apparatus transmitting a detection signal containing status information through a single wire, and performing a predetermined operation upon receiving a response signal to the detection signal; and a main electronic apparatus receiving the detection signal through the single wire and transmitting the response signal having a different signal format from the detection signal to the sub-electronic apparatus.

The main electronic apparatus may include: a control unit transmitting the response signal according to the status information upon receiving the detection signal; and a switching unit switching a transmission path therein according to the reception of the detection signal and the transmission of the response signal.

The sub-electronic apparatus may include: a detection unit detecting internal status of the sub-electronic apparatus; and an operation unit performing a predetermined operation according to the response signal.

The switching unit may include: a first switch being opened when the detection signal is received and being closed when the response signal is transmitted to form a transmission path for the response signal; a detection resistor supplied with a predetermined operating power and electrically connected with the detection unit of the sub-electronic apparatus to detect internal status of the sub-electronic apparatus; and a second switch being closed before the detection signal is received to electrically connect the detection resistor and the detection unit, and being opened when the response signal is transmitted.

The switching unit further may include: a pull-up resistor connected in parallel with the detection resistor, receiving the operating power and transmitting the operating power to the operation unit; and a third switch forming a transmission path for the operating power being transmitted to the operation unit from the pull-up resistor.

The control unit may transmit a Pulse Width Modulation (PWM) control signal in order to control the operation unit according to the detection signal.

The control unit may transmit a start signal according to time division to indicate transmission of a signal, the operation unit may transmit an acknowledgement signal according to time division to indicate acknowledgement of reception of the start signal, and a communication signal containing data information according to time division may be transmitted and received between the operation unit and the control unit.

A data format of a signal being transmitted and received between the sub-electronic apparatus and the main electronic apparatus through the single wire may include: analog containing status information of the detection signal; start and address indicating transmission of the signal from the main electronic apparatus and indicating a data type of the signal; data containing data of the signal; and end indicating termination of the transmission of the signal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
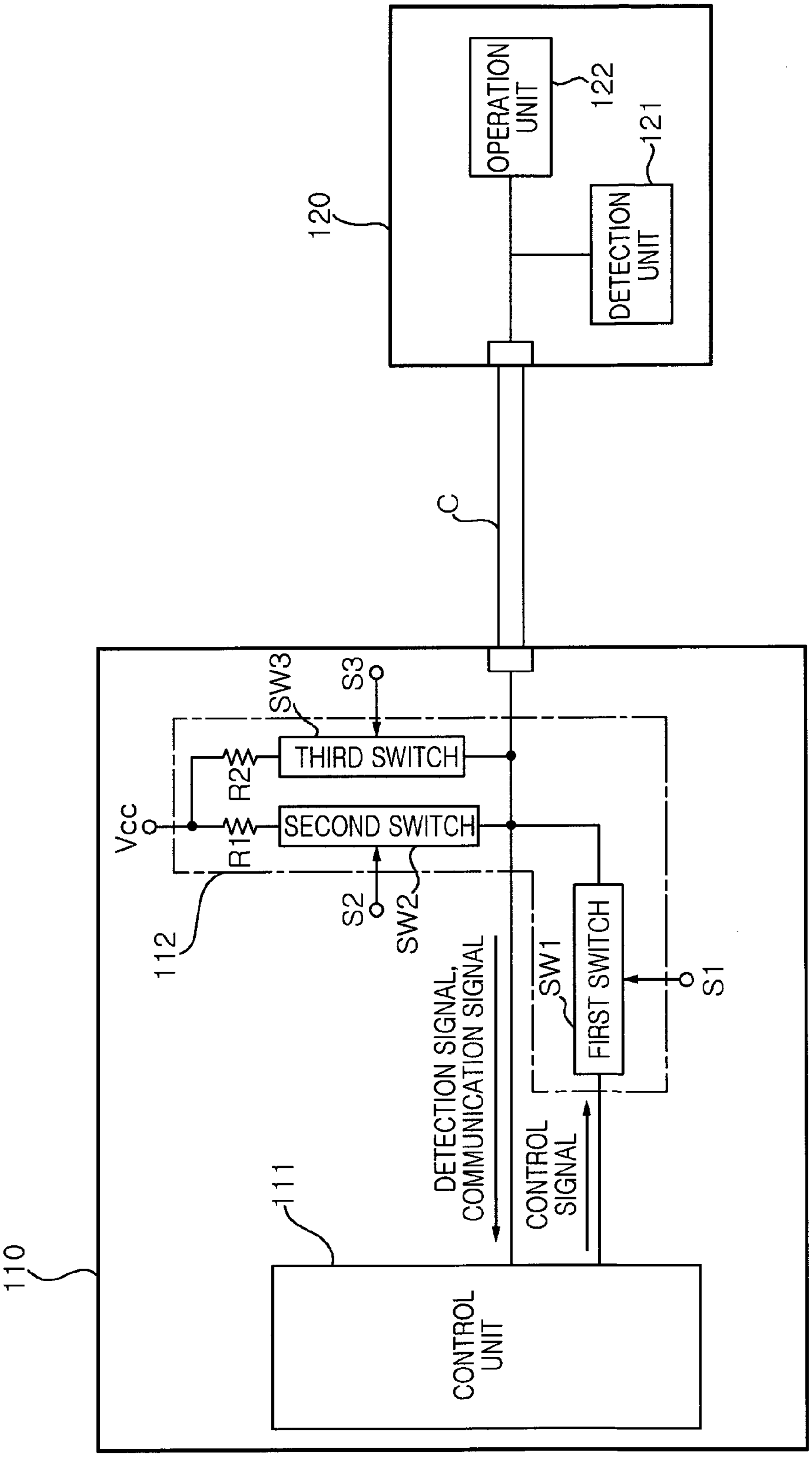
FIG. 1 is a view illustrating the configuration of an electronic apparatus according to an exemplary embodiment of the present invention.

FIG. 1 is a view illustrating the configuration of an electronic apparatus according to an exemplary embodiment of the invention.

Referring to FIG. 1, an electronic apparatus 100 according to this embodiment may include a main electronic apparatus 110 and a sub-electronic apparatus 120.

A single wire C is electrically connected between the main electronic apparatus 110 and the sub-electronic apparatus 120.

The main electronic apparatus 110 may include a control unit 111 and a switching unit 112.

The control unit 111 may receive a detection signal from the sub-electronic apparatus 120 and transmit a response signal to the sub-electronic apparatus 120. Since the transmission and reception of these signals between the main electronic apparatus 110 and the sub-electronic apparatus 120 is performed using the single wire C, a signal transmission path therein needs to be switched.

The switching unit 112 switches the signal transmission path therein to transmit and receive the above-described signals.

The switching unit 112 may include first through third switches SW1 to SW3, a detection resistor R1 and pull-up resistors R1 and R2.

The first switch SW1 is opened when the detection signal from the sub-electronic apparatus 120 is transmitted to the control unit 111. When the response signal from the control unit 111 is transmitted to the sub-electronic apparatus 120, the first switch SW1 is closed according to a switching signal S1 from the control unit 111.

The second switch SW2 is closed in order to transmit the detection signal from the sub-electronic apparatus 120 to the control unit 111, so that power from the detection resistor R1, connected to an operating power Vcc terminal, can be transmitted to the sub-electronic apparatus 120.

The third switch SW3 and the pull-up resistor R2 may be additionally connected in parallel with the second switch SW2 and the detection resistor R1, respectively, to thereby supply power having a different voltage level to the sub-electronic apparatus 120. That is, the operating powers of the sub-electronic apparatus 120 and the main electronic apparatus 110 can have different voltage levels from each other.

The above-described signals and powers are transmitted between the sub-electronic apparatus 120 and the main electronic apparatus 110 through the single wire C.

The sub-electronic apparatus 120 may include a detection unit 121 and an operation unit 122.

The detection unit 121 may include a variable resistor or a thermister. Further, the detection unit 121 may be supplied with power from the main electronic apparatus 110, detect status information inside the sub-electronic apparatus 120 and transmit a detection signal having the detected status information to the main electronic apparatus 110.

The operation unit 122 may receive the response signal from the main electronic apparatus 110 and perform a predetermined operation. Specifically, the operation unit 122 may perform the main operation of the sub-electronic apparatus 120 or detect voltage, current or temperature levels or various kinds of physical quantities and transmit the detected results to the main electronic apparatus 110.

The signal transmission and reception between the main electronic apparatus 110 and the sub-electronic apparatus 120 will be described with reference to the drawings.

Figure 2:
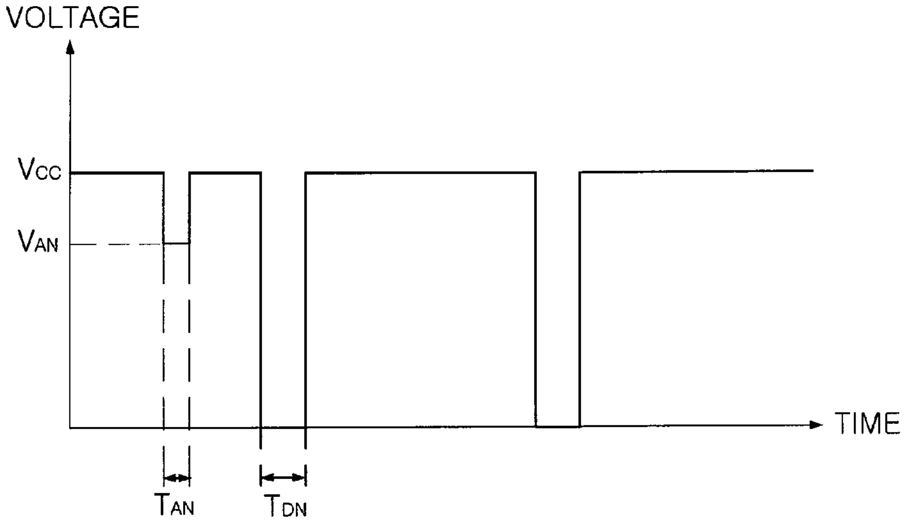
FIG. 2 is a view illustrating the structures of signals being transmitted and received through a single wire used in an electronic apparatus according to an exemplary embodiment of the present invention.

FIG. 2 is a view illustrating the structures of signals being transmitted and received through a signal wire used in an electronic apparatus according to an exemplary embodiment of the invention.

Referring to FIGS. 1 and 2, since the main electronic apparatus 110 and the sub-electronic apparatus 120 are connected to each other using the single wire C, the structures of signals being transmitted and received need to be set to satisfy the single wire C.

First, when the main electronic apparatus 110 and the sub-electronic apparatus 120 are connected to each other using the single wire C, the control unit 111 of the main electronic apparatus 110 controls the on/off operation of each of the first and second switches SW1 and SW2 of the switching unit 112. That is, the control unit 11 opens the first switch SW1 and closes the second switch SW2 so that the operating power Vcc is transmitted to the detection resistor R1 and the detection unit 121.

A voltage level $V_{AN}$ of the status information detected by the detection unit 121 is determined by the following equation: operating power Vcc*(resistance of detection unit 121)/(resistance of detection unit 121+resistance of the detection resistor R1). Therefore, the voltage level of the detection signal can be set to be different from that of the response signal.

Then, the detection signal having the status information is transmitted to the control unit 111 of the main electronic apparatus 110 from the sub-electronic apparatus 120 through the single wire C.

The control unit 111 of the main electronic apparatus 110 then closes the first switch SW1 and opens the second switch SW2 so that the response signal from the control unit 111 is transmitted to the operation unit 122 of the sub-electronic apparatus 120. The response signal may be a Pulse Width Modulation (PWM) control signal from the control unit 111 to control the operation of the operation unit 122 of the sub-electronic apparatus 120.

In FIG. 2, the waveform of the detection signal and the control signal being transmitted and received as described above is shown.

That is, the detection signal and the control signal are shown to have different signal widths $T_{AN}$ and $T_{DA}$ and different voltage levels $V_{AN}$ and Vcc, such that the detection signal and the response signal having different formats are transmitted and received through the single wire C.

Figure 3:
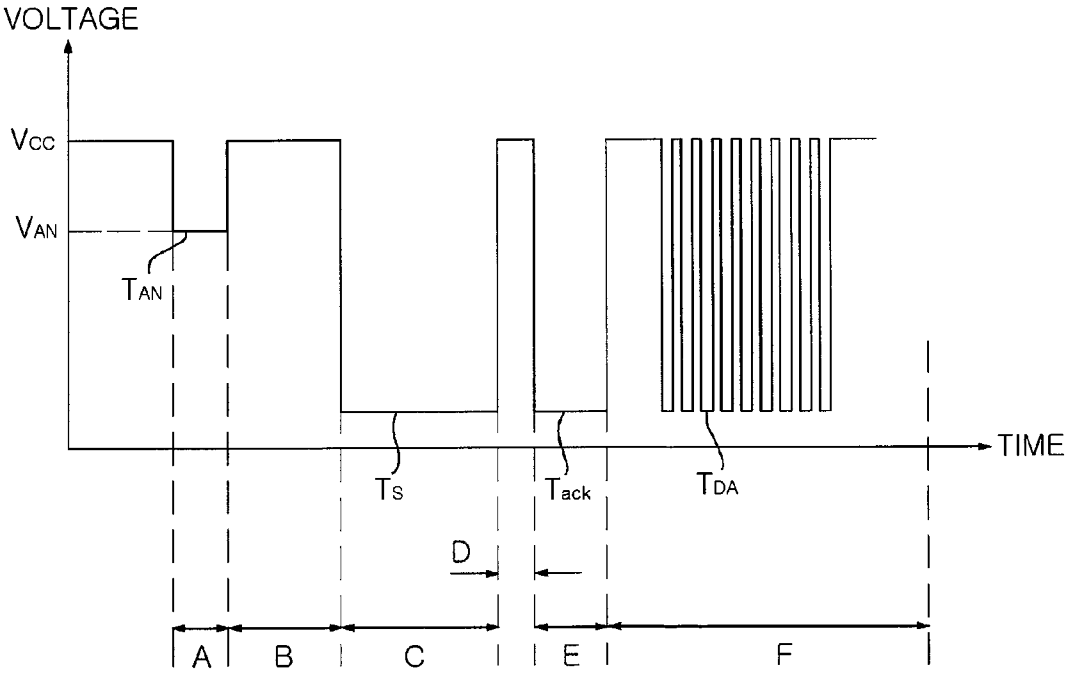
FIG. 3 is a view illustrating structures of signals being transmitted and received through a single wire used in an electronic apparatus according to another exemplary embodiment of the present invention.

FIG. 3 is a view illustrating the structures of signals being transmitted and received through a single wire used in an electronic apparatus according to an exemplary embodiment of the invention.

Referring to FIGS. 1 and 3, like the structures of the signals being transmitted and received, the main electronic apparatus 110 and the sub-electronic apparatus 120 are connected to each other through the single wire C, the structures of the signals being transmitted and received needs to be set suited for the single wire C.

The control unit 111 controls the on/off operation of the first and second switches SW1 and SW2 of the switching unit 112. That is, the control unit 111 opens the first switch SW1 and closes the second switch SW2 so that the operating power Vcc is transmitted to the detection resistor R1 and the detection unit 121, and the detection signal having the status information is transmitted from the sub-electronic apparatus 120 to the control unit 111 of the main electronic apparatus 110 through the single wire C (see reference character A in FIG. 3).

Then, the control unit 111 of the main electronic apparatus 110 closes the first switch SW1 and opens the second switch SW2 so that the control unit 111 and the operation unit 122 can perform communication (see reference characters B through F in FIG. 3). Here, this communication is performed using a time-division method.

Specifically, the control unit 111 releases a port transmitting a signal (see reference character B in FIG. 3) and then transmits a start signal indicating the start of signal transmission. Here, the start signal may have a low voltage level (see reference character C in FIG. 3). The control unit 111 releases the port again (see reference character D in FIG. 3). The operation unit 122 transmits to the control unit, an acknowledge signal indicating the start signal has been received (see reference character E in FIG. 3). Then, the operation unit 122 releases the port to thereby perform data transmission and reception between the control unit 111 and operation unit 122 (see reference character F in FIG. 3).

Here, when a signal is set for time division, a time Ts of the start signal is set to be greater than a time Tack of the response signal. As for the time Ts of the start signal, an address is determined according to timing to thereby perform a predetermined operation.

Figure 4:
FIG. 4 is a data format of the signals shown in FIG. 3.

FIG. 4 is view illustrating a data format of the signals shown in FIG. 3. As shown in FIG. 4, the data format of the signals being transmitted or received between the main electronic apparatus 110 and the sub-electronic apparatus 120 may consist of analog, including the status information of the detection signal being transmitted from the sub-electronic apparatus 120 to the main electronic apparatus 110, start and address indicating that a signal starts to be transmitted from the main electronic apparatus 110 and indicating a data type of the signal, data containing data of the signal, and end indicating the transmission of the signal is terminated. The status information contained in the analog may be analog data detected by the detection unit 121 of the sub-electronic apparatus 120. The start and address, the data and the end may be digital data by the control unit 111 of the main electronic apparatus 110 or the operation unit 122 of the sub-electronic apparatus 120. That is, the data format of the signal being transmitted and received through the single wire C may be a combination of an analog signal and a digital signal.

The start and address may be variously set according to time division as shown in the following table.

TABLE

| | SIGNAL | TIME (ms) MIN | AVG | MAX |
|---|---|---|---|---|
| $T_{AN}$ | TRANSMIT DETECTION SIGNAL | — | 5 | 7 |
| $T_S$ | START | 80 | | 500 |
| $T_S$(M1) | FIRST ADDRESS OF START AND MEMORY | 80 | 100 | 120 |
| $T_S$(M2) | SECOND ADDRESS OF START AND MEMORY | 180 | 200 | 220 |
| $T_S$(M3) | THIRD ADDRESS OF START AND MEMORY | 280 | 300 | 320 |
| $T_{ack}$ | ACKNOWLEDGE | 10 | 30 | 50 |

Referring to Table, and FIGS. 3 and 4, time assigned to the start signal that is contained in the start and address is set to 100 msec, 200 msec or 300 msec on average. When a plurality of sub-electronic apparatuses are connected to a main electronic apparatus, corresponding sub-electronic apparatuses among the plurality of sub-electronic apparatuses may be controlled or a diverse array of controlling may be set to one sub-electronic apparatus. For example, as described above, when the operation unit 122 can detect voltage, current, temperature or various kinds of physical quantities, the control unit 111 may ask the operation unit 122 to transmit various types of detection data according to the above-described addresses. Furthermore, in order that a detection signal, a start signal and an acknowledgement signal having different signal formats are transmitted and received through a single wire, times thereof may be set to be different from each other.

As described above, according to embodiments of the invention, an electronic apparatus, for example, a fuel cell circuit or a printer, which requires a cartridge, a main electronic apparatus performing the main operation and a sub-electronic apparatus forming a cartridge and accompanying circuitry are connected through a single wire, status information about a fuel cell cartridge or an ink cartridge is transmitted, and control and communication are performed using the single wire, thereby reducing physical device dimensions and manufacturing costs.

As set forth above, according to exemplary embodiments of the invention, as a main electronic apparatus and a sub-electronic apparatus are connected through a single wire, status information can be transmitted and control and communication can be performed through the single wire, thereby reducing physical device dimensions and manufacturing costs.

While the present invention has been shown and described in connection with the exemplary embodiments, it will be apparent to those skilled in the art that modifications and variations can be made without departing from the spirit and scope of the invention as defined by the appended claims.

What is claimed is:

1. An electronic apparatus for transmitting and receiving a signal through a single wire, the electronic apparatus comprising:

a sub-electronic apparatus configured to transmit a detection signal containing status information through a single wire and perform a predetermined operation upon receiving a response signal to the detection signal; and a main electronic apparatus configured to receive the detection signal through the single wire and transmit the response signal having a different signal format from the detection signal to the sub-electronic apparatus, wherein the main electronic apparatus includes a control unit configured to transmit the response signal according to the status information upon receiving the detection signal, and a switching unit configured to switch a transmission path therein according to a reception of the detection signal and a transmission of the response signal, the sub-electronic apparatus includes a detection unit configured to detect an internal status of the sub-electronic apparatus, and an operation unit configured to perform the predetermined operation according to the response signal, and the switching unit includes a first switch configured to be opened when the detection signal is received and closed when the response signal is transmitted to form a transmission path for the response signal, a detection resistor electrically connected to the detection unit of the sub-electronic apparatus and configured to receive a predetermined operating power and detect internal status of the sub-electronic apparatus, and a second switch configured to be closed before the detection signal is received to electrically connect the detection resistor and the detection unit and opened when the response signal is transmitted.

2. The electronic apparatus of claim 1, wherein the switching unit further includes a pull-up resistor connected in parallel with the detection resistor and configured to receive the operating power and transmit the operating power to the operation unit, and a third switch forming a transmission path for the operating power transmitted to the operation unit from the pull-up resistor.

3. The electronic apparatus of claim 1, wherein the control unit is configured to transmit, as the response signal, a Pulse Width Modulation (PWM) control signal in order to control the operation unit according to the detection signal.

4. The electronic apparatus of claim 1, wherein the control unit is configured to transmit a start signal indicating a transmission of a signal in a time-division manner, the operation unit is configured to transmit an acknowledgement signal indicating an acknowledgement of reception of the start signal in a time-division manner, and the operation unit and the control unit are configured to exchange a communication signal containing data information in a time-division manner with each other.

* * * * *